United States Patent [19]
Dohrmann et al.

[11] Patent Number: 5,195,766
[45] Date of Patent: Mar. 23, 1993

[54] BICYCLE WITH FRONT FORK SUSPENSION

[75] Inventors: Wolfgang Dohrmann, Eitorf; Alfred Schiefen, Windeck, both of Fed. Rep. of Germany

[73] Assignee: Boge AG, Eitorf, Fed. Rep. of Germany

[21] Appl. No.: 707,561

[22] Filed: May 30, 1991

[30] Foreign Application Priority Data

Jun. 5, 1990 [DE] Fed. Rep. of Germany ....... 4017924

[51] Int. Cl.⁵ ...................... B62K 25/08; B62K 25/06
[52] U.S. Cl. ..................................... 280/276; 280/277
[58] Field of Search ............ 280/276, 277, 279, 280, 280/281.1, 284, 285, 286; 188/322.19, 322.12, 321.11; 267/64.26, 226

[56] References Cited

U.S. PATENT DOCUMENTS

| | | | |
|---|---|---|---|
| 3,256,960 | 6/1966 | Casimir | 188/317 X |
| 4,153,266 | 5/1979 | Uhls | 280/276 |
| 4,553,769 | 11/1985 | Kawaguchi | 280/276 |
| 4,971,344 | 11/1990 | Turner | 280/276 |
| 5,088,705 | 2/1992 | Tsai | 280/284 X |

Primary Examiner—Charles A. Marmor
Assistant Examiner—Jeffrey A. Kuta
Attorney, Agent, or Firm—Nils H. Ljungman and Associates

[57] ABSTRACT

A bicycle having a frame to which is attached two wheels, the wheels being linked in such a manner that the application of the proper force results in substantial movement, or slowing of the motion, of the bicycle, more particularly for a bicycle having a suspension system which comprises a front fork, consisting of two fork tubes for fastening a wheel, a steering head and a handlebar stem connected to the steering head, whereby each fork tube consists of at least two tubes which can move in telescope fashion one inside the other, as well as at least one suspension element and a damping device.

2 Claims, 7 Drawing Sheets

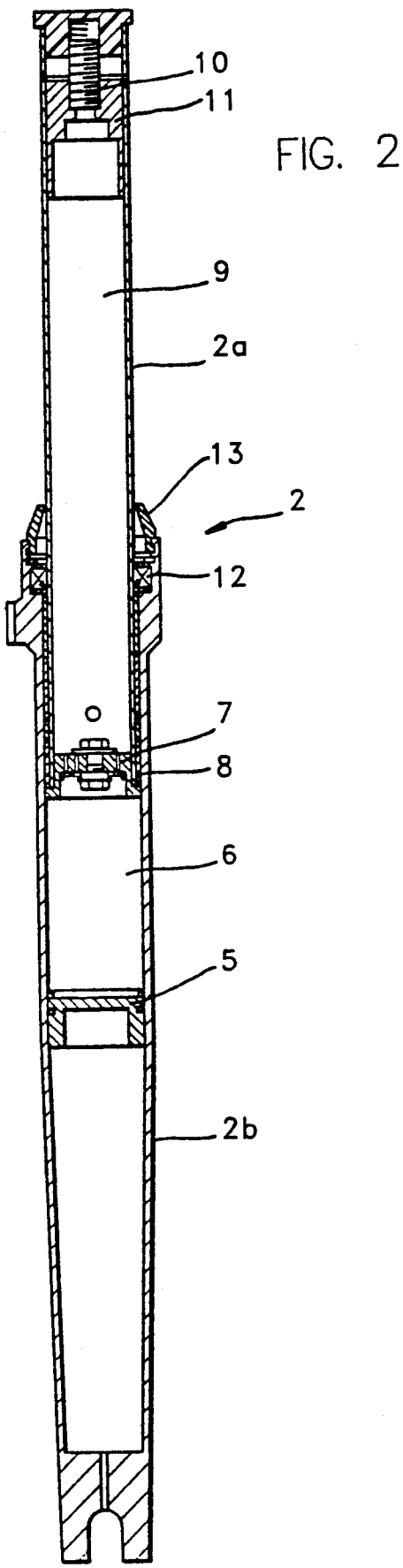
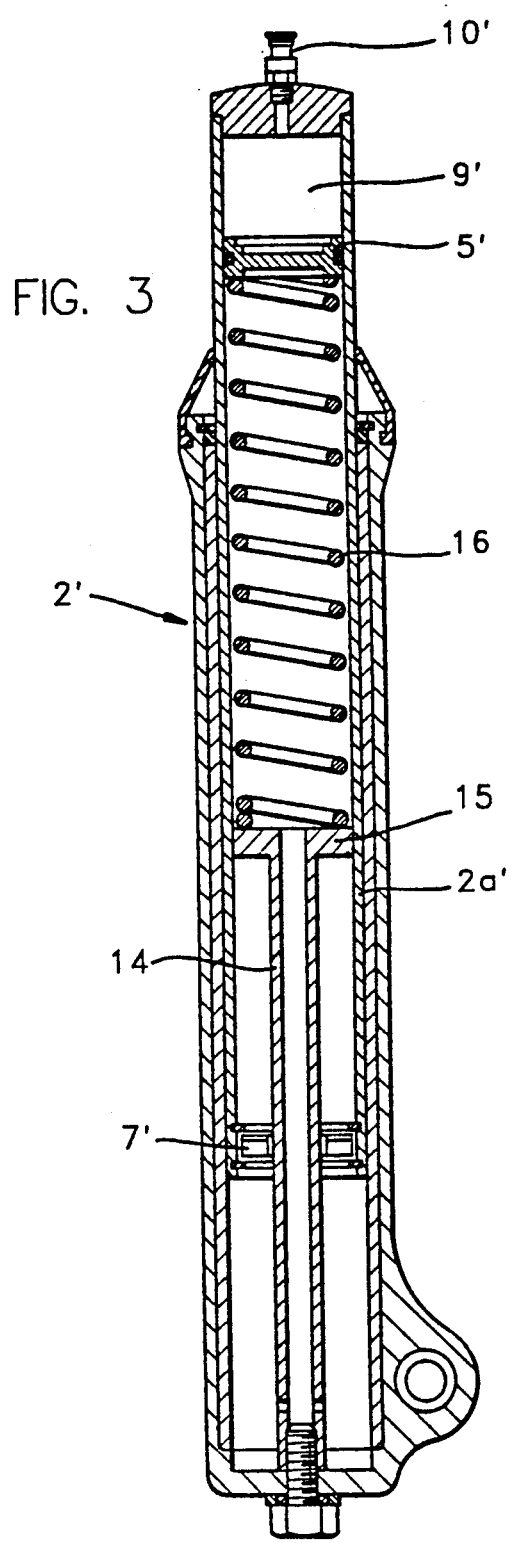
FIG. 2
FIG. 3

BICYCLE WITH FRONT FORK SUSPENSION

BACKGROUND OF THE INVENTION

1. Field of the Invention

This invention relates to a bicycle comprising a frame to which is attached two wheels, the wheels being linked in such a manner that the application of the proper force will substantially move or, slow the movement of, the bicycles, and bicycles with front forks especially to a bicycle having a suspension system in which the front fork consists of two fork tubes for fastening a wheel, a steering head and a handlebar stem connected to the steering head.

2. Background Information

The prior art includes bicycles with frames to which are attached two wheels, the wheels being linked in such a manner that the application of the proper force will substantially move or, slow the movement of, these bicycles, and also includes bicycles with the front fork is designed as one piece with the steering head and handlebar stem, and is used in a rigid configuration.

OBJECT OF THE INVENTION

The object of the invention is to configure a bicycle with a frame to which is attached two wheels, the wheels being linked in such a manner that the application of the proper force will substantially move or, slow the movement of, the bicycle which bicycle has a front fork so that the front wheel of the bicycle is provided with a suspension to substantially reduce the effect that rough spots in the ground have on the rider of the bicycle.

SUMMARY OF THE INVENTION

This object is achieved in a frame to which is attached two wheels, the wheels being linked in such a manner that the application of the proper force will substantially move or, slow the movement of, the bicycle, in that each fork tube consists of at least two tubes which move in telescope fashion one inside the other, at least one spring or suspension element, and a damping device. One advantage of this configuration is that the vibrations introduced by the wheel are absorbed in the front fork.

In accordance with an additional essential feature, the damping device is an integral part of the inner tube connected to the steering head.

In one configuration of the invention, a pneumatic spring functions as the spring or suspension element.

The outer tube also has a sealed bottom to delimit a fluid chamber. Another advantage of this configuration, is that the damping device is simultaneously designed as a work piston.

In accordance with an additional feature, the inner tube has a vent plug on the side opposite the damping device. The vent plug advantageously has a filling or charging valve.

To achieve a variable damping characteristic, at least one of the tubes is provided with a valve for charging or filling.

To achieve a uniform pressure distribution in the two fork tubes, both fork tubes are equipped with a pneumatic spring and are connected to one another by means of a flow connection, whereby the flow connection advantageously has a valve for the joint filling or charging of both fork tubes.

To install a standard front fork on different bicycles, the steering head is designed as a clamp connection and the fork tubes and/or the handlebar stem are connected to it by means of a force-fitted or positive connection. By replacing the handlebar stem, it is possible to make the necessary adjustment to the bicycle model in question.

In one simple and advantageous configuration, the spring or suspension element is a coil spring.

To achieve a damping, the damping device has throttle openings, which are covered by spring-mounted valve discs. By means of an appropriate configuration of the decompression and compression stages, it thereby becomes possible to achieve symmetrical or asymmetrical damping.

In one configuration of the invention, the inner tube has a piston ring on its external surface to seal it against the outer tube.

One aspect of the invention resides broadly in a bicycle comprising: a front wheel and a rear wheel; moving apparatus for causing movement of at least one of the front wheel and the rear wheel, the moving apparatus comprising a chain, at least two sprockets to engage the chain, and at least two pedals connected to one of the at least two sprockets, the moving apparatus comprising solely foot powered moving apparatus, the foot powered moving apparatus comprising the sole moving apparatus for propelling the bicycle during riding of the bicycle by a cyclist; braking device for substantially slowing the movement of the bicycle; a seat; a frame connected to the seat and to the rear wheel; handle mechanism for guiding the bicycle; a fork connected to the front bicycle wheel; connecting device for connecting the handle mechanism and the fork to the frame. The fork has a fork member on each side of the front wheel; each of the fork members has a shock absorbing mechanism; each of the shock absorbing mechanisms comprising: a first cylinder and a second cylinder, the second cylinder being telescopically movable into said first cylinder. A damping device is disposed in the second cylinder for damping oscillation of the shock absorbing mechanism, the damping device comprising a piston. Damping fluid is disposed in the first cylinder; and a biasing device for providing biasing between the first cylinder and the second cylinder, the biasing device being disposed in said second cylinder.

Another aspect of the invention resides broadly in a fork for fastening a wheel to a bicycle, the fork comprising: a fork member on each side of the wheel; each of the fork members having shock absorbing mechanisms; each of the shock absorbing mechanisms comprising: a first cylinder and a second cylinder, the second cylinder being telescopically slideable into the first cylinder; damping device disposed in the second cylinder for damping oscillation of the shock absorbing mechanism, the damping device being a piston; damping fluid disposed in the first cylinder; and biasing device for providing biasing between the first cylinder and the second cylinder, the biasing device being disposed in the second cylinder.

Yet another aspect of the invention resides broadly in a front fork for a bicycle, the front fork comprising: a fork member on each side of a wheel; each of the fork members having shock absorbing mechanism; each of the shock absorbing mechanisms comprising: a first cylinder and a second cylinder, the second cylinder being telescopically movable into the first cylinder; damping device disposed in the second cylinder for damping oscillation of the shock absorbing mechanism. the damping device comprising a piston; damping fluid disposed in the first cylinder; and biasing device for providing biasing between the first cylinder and the second cylinder, the biasing device being disposed in the second cylinder.

BRIEF DESCRIPTION OF THE DRAWINGS

Preferred embodiments are illustrated schematically in the accompanying drawings.

FIG. 2 shows a fork tube, of the bicycle shown in FIG. 1, as an individual part.

FIG. 3 shows an additional embodiment of a fork tube for the bicycle shown in FIG. 1.

DESCRIPTION OF THE PREFERRED EMBODIMENTS

Figure 1:
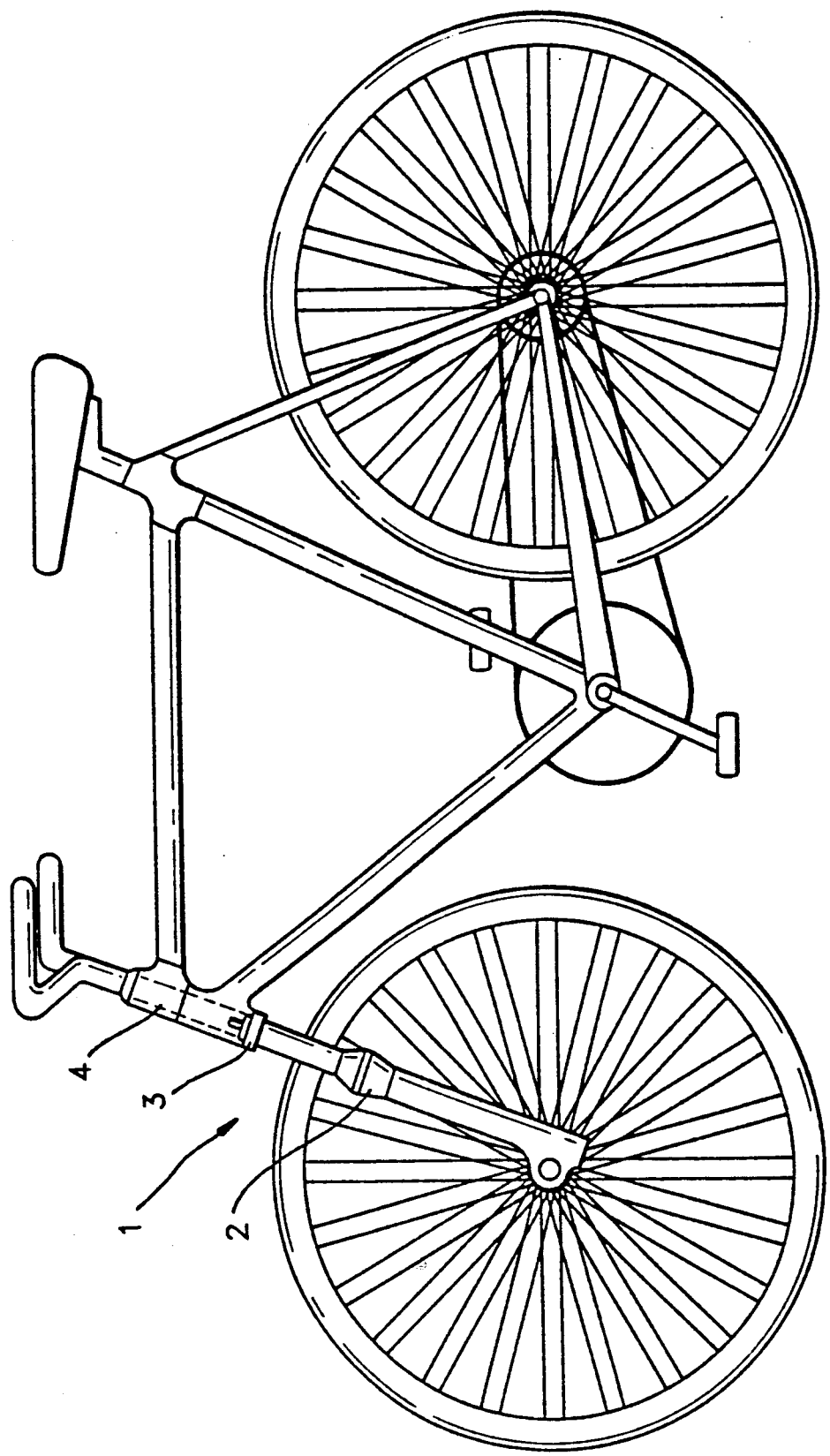
FIG. 1 shows an overall view of a bicycle.
Figure 1A:
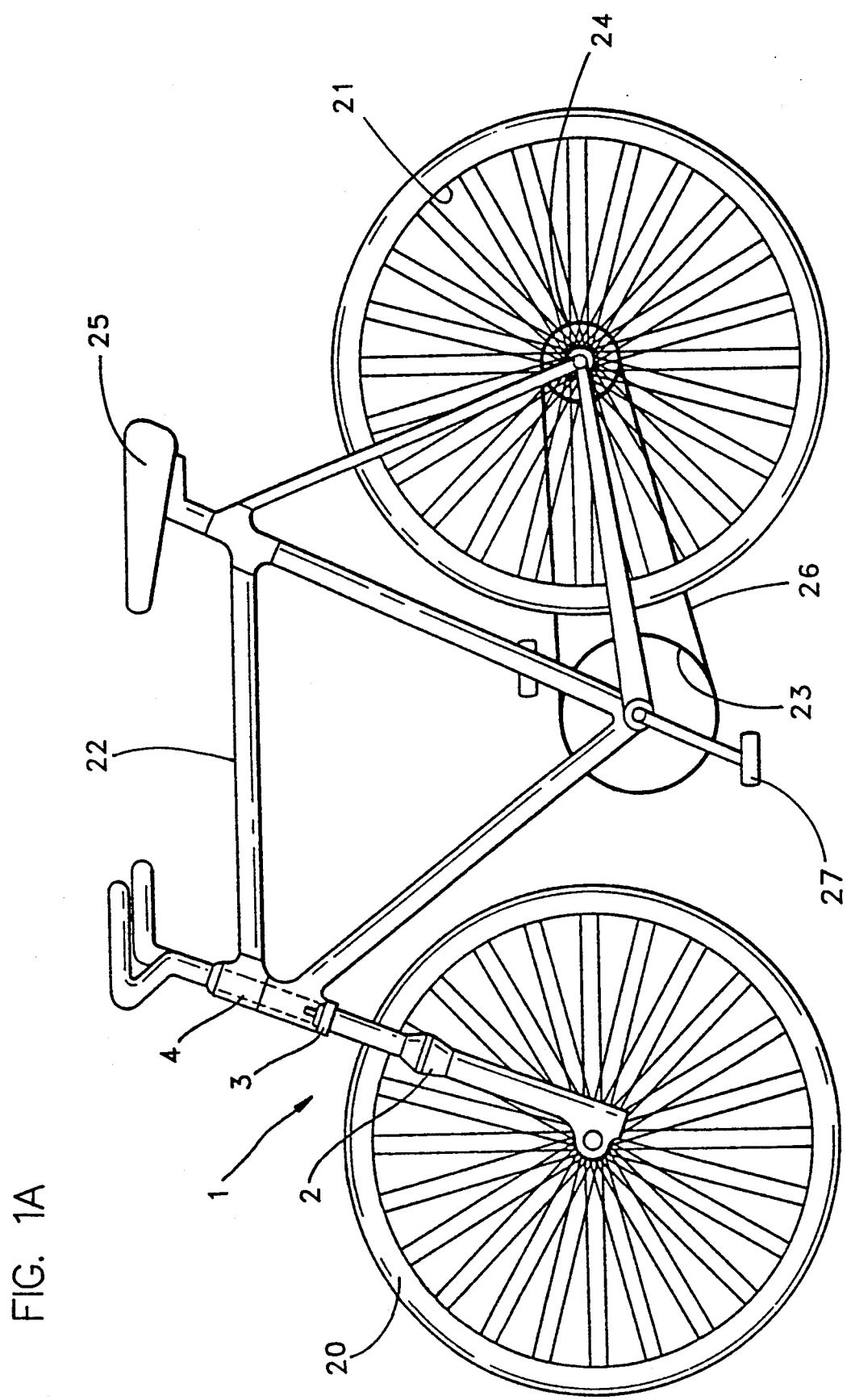
FIG. 1A shows the bicycle of FIG. 1, as well as additional structures.

FIG. 1A shows a bicycle having a front wheel 20, and a rear wheel 21. The wheels 20, 21 are attached to a frame 22. Movement of a pulley-like, chain and pedal system causes the rear wheel 21 to rotate. In other words, the pedals 27 are attached to the hub of a gear or sprocket 23 the outside of which engages a chain 26. When the pedals 27 are moved in a forward circular direction, the gear 23 turns the chain 26. The chain 26 is connected in a pulley-like fashion to another gear 24 which is attached to the rear wheel 21. The forward rotation of the rear wheel 21 sets the front wheel 20 into synchronous motion. Conversely, the movement of the bicycle is substantially slowed via a braking system 24, which operates to slow the rotation of the rear wheel 21, and consequently the forward movement of the bicycle itself. A seat 25, attached to the frame 22, is provided for the comfort of a rider of the bicycle.

The bicycle illustrated in FIG. 1 has, among other things, a suspension system comprising a front fork 1 consisting of two fork tubes 2, a steering head 3 and a handlebar stem 4 connected to the steering head 3.

Figure 1B:
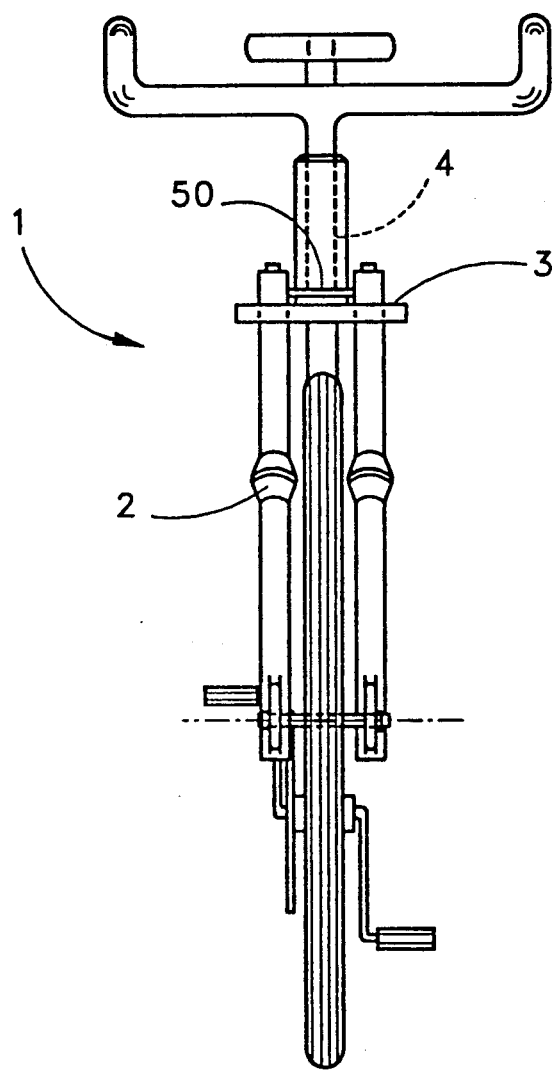
FIG. 1B shows a front view of the bicycle of FIG. 1 having suspension fork tubes.

FIG. 1B is a front view of the bicycle shown in FIG. 1, further illustrating the suspension system. The fork tubes 2 can be firmly attached to the steering head 3 on one end, and connected to the front wheel of the bicycle on the other end, by any of the various methods known in the art. A flow connection 50 may be connected to valve 10 to jointly fill the fork tubes 2, at the same time, and thereby equalize the pressure between them.

The fork tube 2 illustrated in FIG. 2 consists of two cylinders or tubes 2a and 2b which can move in telescope fashion one inside the other, where 2a is the inner tube and 2b the outer tube. The outer tube 2b has a bottom 5, which seals the fluid chamber 6 against the remaining cavity of the outer tube 2b. The inner tube 2a has a damping device 7, which is simultaneously designed as a work piston. In the vicinity of the damping device 7, on the outer surface of the inner tube 2a, there is a piston ring 8 in the form of a piston sheet which functions to seal the inner tube 2a against the outer tube 2b. The cavity 9 of the inner tube 2a is used to absorb the damping fluid displaced from the fluid chamber 6, and also to receive gas via the valve 10, which is located in the vent plug 11. For the additional sealing of the inner tube 2a from the outer tube 2b, there is a gasket 12 and a wiper ring 13.

Figure 3A:
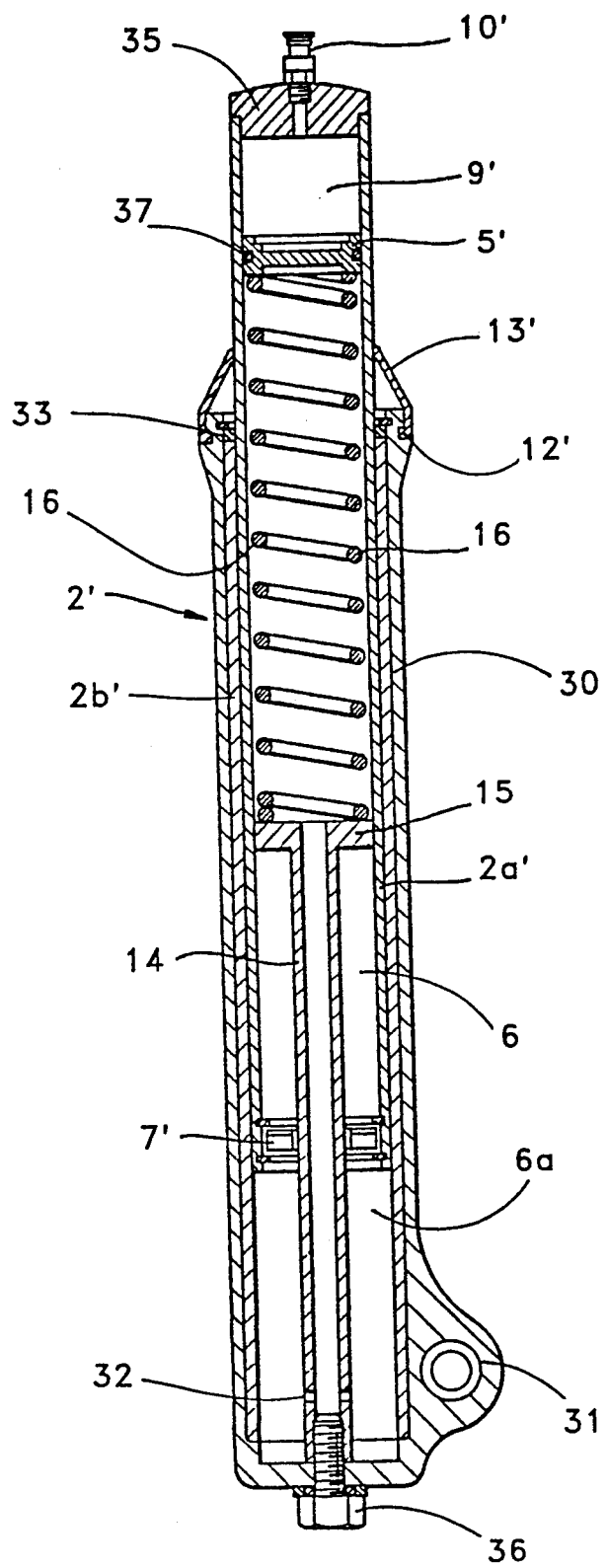
FIG. 3A shows the additional embodiment of the fork tube of FIG. 3, with additional structures shown.

FIG. 3 shows an additional embodiment of a fork tube 2', whereby the damping device 7' is located in the lower portion of the inner or sliding tube 2a' and is traversed by a hollow piston rod 14. The hollow piston rod 14 has a contact surface 15 against which a coil spring 16 is braced. On its opposite end, the coil spring 16 is braced against a bottom 5', which is mounted so that it can move axially, as a function of the gas-filled cavity 9' of the sliding, inner tube 2a'. The cavity 9' can be pressurized by means of the valve or pneumatic connection 10'. The gas chamber 9' is sealed by a cover 35, as shown in FIG. 3A.

In addition, FIG. 3A also shows the housing 30 in which the outer or standing tube 2b' is disposed. The housing 30 has a fastening lug 31 for connecting the fork tube 2' to the front wheel 20 of the bicycle. The embodiment of FIG. 3A also has a wiper or wiper ring 13', a gasket or sliding tube seal 12', as well as a fastening ring 33 for additional sealing of the sliding tube 2a' and the stationary tube 2b'.

There is a fluid chamber or cavity 6 in the inner tube 2a', located between the piston or damping device 7' and the contact surface 15, which contains oil. The oil in the fluid chamber 6 is under varying amounts of pressure based on the amount of compression of the coil spring 16 in the inner tube 2a'. Outer or standing tube 2b' also has a fluid chamber 6a which is filled with oil. Fluid chambers 6 and 6a function together to dampen oscillations in the fork tube 2'. The work piston 7' also has both compression and decompression stages to damp oscillations in the fork tube 2'.

The hollow piston rod 14 is attached to the housing 30 by a fastening bolt 36 on an end opposite that of the contact surface or axial stop 15. The hollow piston rod 14 also has a hole 32 which opens into the lower portion of the stationary tube 2b'. The contact surface 15 of the hollow piston rod 14 is pushed against the coil spring 16 during the compression stage, which corresponds to a rough spot in the road overwhich the bicycle wheel has traveled. The axial stop 15 may function to prevent the piston 7' from pushing out of the cylinder or tube 2a'. The bottom or separating piston 5' may be held in place by a sealing ring 37.

In other words, when the front wheel 20 of the bicycle encounters an uneven portion in the road, sliding tube 2a' moves into standing tube 2b'. As cylinder or tube 2a' slides into cylinder or tube 2b', the damping device 7' decrease the space in cavity 6a. At the same time, hollow piston rod 14 with the attached stop 15, is moving further into inner tube 2a', in so doing contact surface 15 is compressing coil spring 16. The opposite end of coil spring 16 is pushing against separating piston or bottom 5', which, in turn, compresses the gas in chamber 9'. The vibration caused by a possible pothole is thereby substantially absorbed through the fork member.

Figure 4:
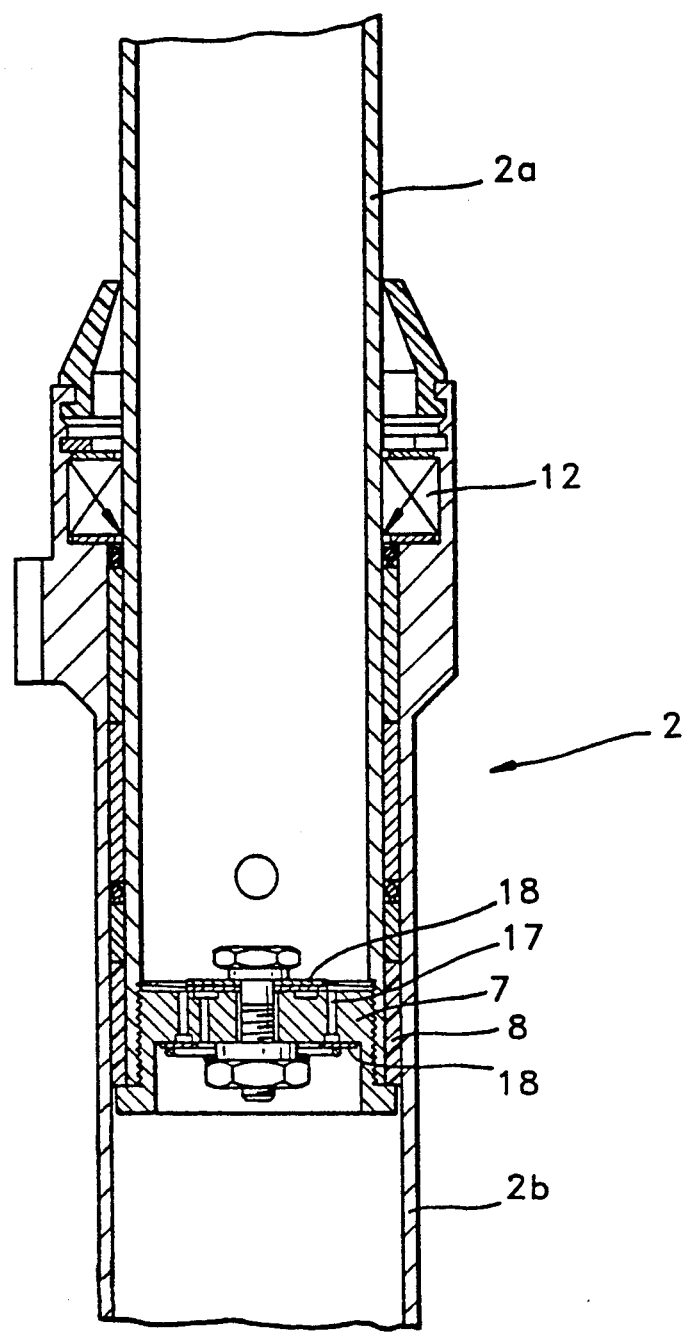
FIG. 4 is a cross section of the telescoping tubes in the vicinity of the damping device, of the fork tube shown in FIG. 2.

FIG. 4 shows an enlarged portion of the fork tube 2, as shown in FIG. 2, in which the inner tube 2a moves in telescope fashion inside the outer tube 2b, and in which the inner tube 2a has a damping device 7. The sealing of the inner tube 2a is accomplished on one hand by the piston ring 8 and on the other hand by the gasket 12. The damping device 7 thereby has separate throttle openings 17, 17a for the decompression and compression stages, which are covered by valve discs 18. One group of throttle openings 17 is responsible for the compression stage, and another group is responsible for the decompression stage. The corresponding damping force is thereby determined by the throttle openings 17 themselves and by the valve discs 18.

Figure 4A:
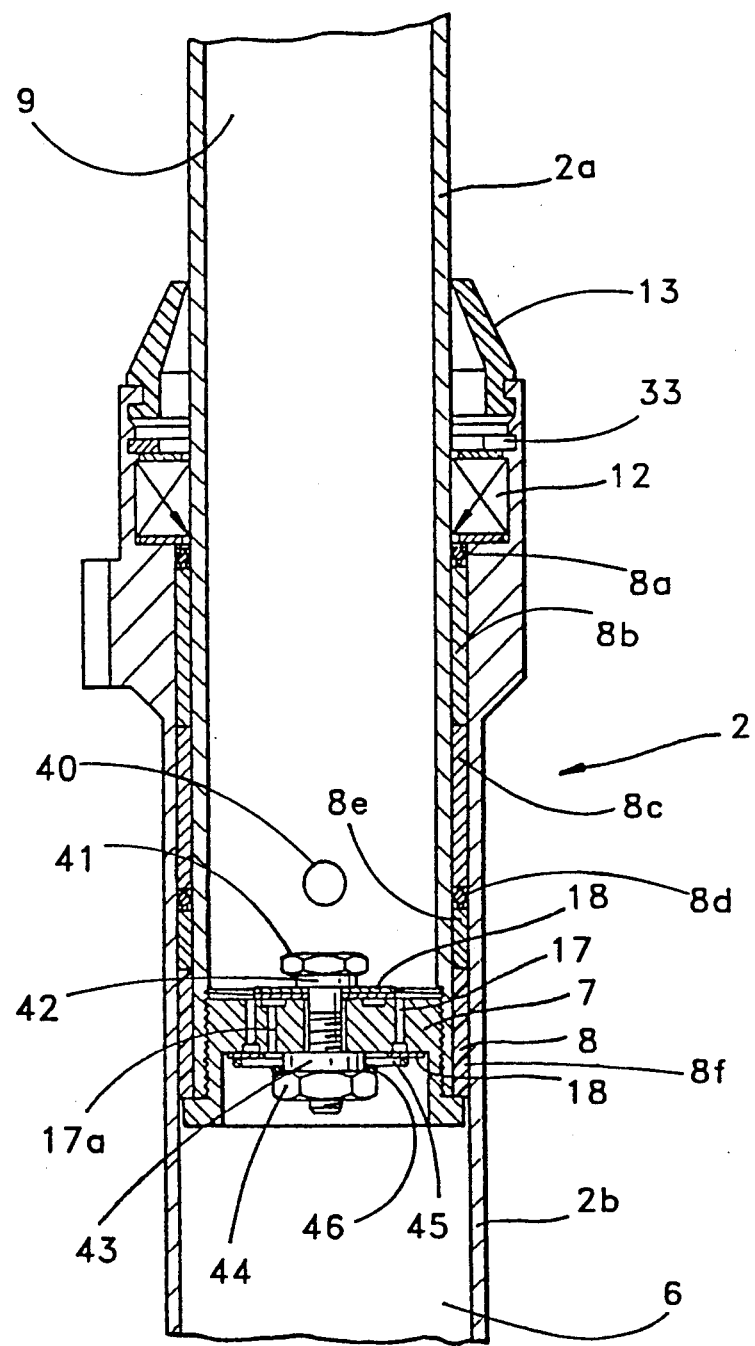
FIG. 4A shows the cross section of the telescoping tubes of FIG. 4, with additional structures shown.

FIG. 4A further illustrates the structures of the fork tube 2, and more specifically, the damping device 7. A bolt 41 holds washer or collar 42 over the valve disk 18 which covers throttle opening 17a. Collar or washer 43 is secured to the opposite end of bolt 41 by nut 44. Collar 43 is surrounded by spring washer 45, which together function to hold valve disk 18 in proper position over throttle opening 17. Lock washer 46 is placed between nut 44 and collar 43 to further secure valve disk 18. A damping medium in chambers 6 and 9 may be forced through throttle openings 17 during compression.

FIG. 4A also shows piston ring 8 which may be a piston film or sheet comprised of various sections: 8a, 8b, 8c, 8d, 8e, 8f. These sections 8a-8f may function to substantially minimize friction while sealing the tubes. Preferably 8f functions as a piston ring, and the other sections may possibly provide a variety of other functions including guiding or sealing tubes 2a and 2b. A hole 40 is preferably located in inner cylinder 2a for possibly venting a space between inner tube 2a and outer tube 2b, which space may possibly result during the compression stage.

In other words, when the front tire 20 of the bicycle hits a rough spot in the travel path, the inner tube 2a telescopically slides into the outer tube 2b. As inner tube 2a slides, it decreases the space in cavity 6, which, in turn, compresses the fluid within cavity 6. The fluid, then squeezes through throttle opening 17a, and into chamber 9. Conversely, during decompression, tube 2e slides out of tube 2b. The damping fluid, then flows back through the throttle openings 17 in damping device 7. This compression and decompression substantially cushions the vibrations which flow through the bicycle as a result of the uneven terrain.

In summary, one feature of the invention resides broadly in a front fork for bicycles, consisting of two fork tubes for fastening a wheel, a steering head and a handlebar stem connected to the steering head, characterized by the fact that each fork tube 2 consists of at least two tubes 2a, 2b which can move one inside the other in telescope fashion, and at least one spring or suspension element and a damping device 7.

Another feature of the invention resides broadly in a front fork which is characterized by the fact that the damping device 7 is a component of the inner tube 2a connected to the steering head 3.

Yet another feature of the invention resides broadly in a front fork which is characterized by the fact that there is a pneumatic spring as the spring or suspension element.

Still another feature of the invention resides broadly in a front fork which is characterized by the fact that the outer tube 2b has a sealed base 5 which delimits a fluid chamber 6.

Another feature of the invention resides broadly in a front fork which is characterized by the fact that the damping device 7 is simultaneously designed as a work piston.

Still another feature of the invention resides broadly in a front fork which is characterized by the fact that the inner tube 2a has a vent plug 11 on the side opposite the damping device 7.

A further feature of the invention resides broadly in a front fork which is characterized by the fact that at least one of the tubes 2a, 2b is equipped with a valve 10 for filling or charging.

Yet another feature of the invention resides broadly in a front fork which is characterized by the fact that the vent plug 11 has a valve 10 for filling or charging.

Still another feature of the invention resides broadly in a front fork which is characterized by the fact that both fork tubes 2 have a pneumatic spring and are connected to one another by means of a flow connection.

Another feature of the invention resides broadly in a front fork which is characterized by the fact that the flow connection has a valve 10 for the joint filling or charging of the two fork tubes 2.

Still another feature of the invention resides broadly in a front fork which is characterized by the fact that the steering head 3 is designed as a clamp connection, and holds the fork tubes 2 and/or the handlebar stem 4 in a positive and/or form-fitting connection.

Yet another feature of the invention resides broadly in a front fork which is characterized by the fact that the spring or suspension element is a coil spring 16.

A yet further feature of the invention resides broadly in a front fork which is characterized by the fact that the damping device 7 has throttle holes 17, which are covered by spring-mounted valve discs 18.

Still another feature of the invention resides broadly in a front fork which is characterized by the fact that the inner tube 2a has a piston ring 8 on its outer surface to seal it against the outer tube 2b.

Other types of shock absorbers which could be used in alternative embodiments of the invention may be found in: U.S. Pat. No. 4,802,561, issued Feb. 7, 1989, entitled, "Adjustable Shock Absorber," U.S. Pat. No. 4,834,222, issued May 30, 1989, entitled, "Hydraulic Damper," U.S. Pat. No. 3,837,445, issued Sep. 24, 1974, entitled, "Piston Assembly for a Shock Absorber," U.S. Pat. No. 3,312,312, issued Apr. 4, 1967, entitled, "Shock Absorbers," and U.S. Pat. No. 3,256,960, issued Jun. 21, 1966, entitled, "Hydraulic Adjustable Valve Biasing Means." The above-cited U.S. patents are hereby incorporated by reference herein, as if set forth in their entirety.

In summary, one aspect of the invention relates to a bicycle having a suspension system which comprises a front fork, consisting of two fork tubes for fastening a wheel, a steering head and a handlebar stem connected to the steering head, whereby each fork tube consists of at least two tubes which can move in telescope fashion one inside the other, as well as at least one suspension element and a damping device.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A bicycle comprising:

a front wheel and a rear wheel;

moving means for causing movement of at least one of said front wheel and said rear wheel, said moving means comprising a chain, at least two sprockets to engage said chain, and at least two pedals connected to one of said at least two sprockets, said moving means comprising solely foot powered moving means, said foot powered moving means comprising the sole moving means for propelling said bicycle during riding of said bicycle by a cyclist;

braking means for substantially slowing the movement of said bicycle;

a seat;

a frame connected to said seat and said rear wheel;

handle means for guiding said bicycle;

a fork connected to said front bicycle wheel; and connecting means for connecting said handle means and said fork to said frame;

said fork having a fork member on each side of said front wheel;

each of said fork members having shock absorbing means; each of said shock absorbing means comprising:

a first cylinder and a second cylinder, said second cylinder being telescopically movable into said first cylinder;

damping means disposed in said second cylinder for damping oscillation of said shock absorbing means, said damping means comprising a piston;

damping fluid disposed in said first cylinder; and biasing means for providing biasing between said first cylinder and said second cylinder, said biasing means being disposed in said second cylinder;

wherein said second cylinder has a first end and a second end, said second end being disposed opposite to said first end, said damping means being disposed in said first end of said second cylinder, said second end of said second cylinder being connected to said connecting means;

wherein said biasing means comprises a coil spring;

wherein said coil spring is braced against a contact surface;

wherein said damping means is disposed in said first end of said second cylinder, said damping means being traversed by a hollow piston rod, said hollow piston rod having a first side and a second side, said first side being fastened to said contact surface, said second side being connected to said first cylinder;

wherein said second cylinder further comprises a base member, said base member being sealed in said second cylinder by a sealing ring disposed around said base member, said coil spring being braced against said base member, said base member and said second cylinder limit a chamber, said chamber being filled with fluid, said fluid being gas, said second cylinder further comprising valve means, said valve means for pressurizing said fluid in said chamber, said base member being a piston; and wherein said first cylinder is disposed in a housing, said housing being fastened to said bicycle wheel by a fastening lug, said housing further comprising at least one of a fastening ring, a gasket, and a wiper ring.

2. A fork for fastening a wheel to a bicycle, said fork comprising:

a fork member for being disposed on each side of a front wheel of a bicycle;

each of said fork members having shock absorbing means;

each of said shock absorbing means comprising:

a first cylinder and a second cylinder, said second cylinder being telescopically slideable into said first cylinder;

damping means disposed in said second cylinder for damping oscillation of said shock absorbing means, said damping means comprising a piston;

damping fluid disposed in said first cylinder; and biasing means for absorbing movement between said first cylinder and said second cylinder, said biasing means being disposed in said second cylinder;

wherein said second cylinder has a first end and a second end, said second end being disposed opposite to said first end, said damping means being disposed in said first end of said second cylinder, said second end of said second cylinder being connected to said connecting means;

wherein said biasing means comprises a coil spring;

wherein said coil spring is braced against a contact surface;

wherein said damping means is disposed in said first end of said second cylinder, said damping means being traversed by a hollow piston rod, said hollow piston rod having a first side and a second side, said first side being fastened to said contact surface, said second side being connected to said first cylinder;

wherein said second cylinder further comprises a base member, said base member being sealed in said second cylinder by a sealing ring disposed around said base member, said coil spring being braced against said base member, said base member and said second cylinder limit a chamber, said chamber being filled with fluid, said fluid being gas, said second cylinder further comprising valve means, said valve means for pressurizing said fluid in said chamber, said base member being a piston; and wherein said first cylinder is disposed in a housing, said housing having a fastening lug for fastening a bicycle wheel to said housing, said housing further comprising at least one of fastening ring, a gasket, and a wipe ring.

* * * * *

UNITED STATES PATENT AND TRADEMARK OFFICE
CERTIFICATE OF CORRECTION

PATENT NO. : 5,195,766

DATED : March 23, 1993

INVENTOR(S) : Wolfgang DOHRMANN and Alfred SCHIEFEN

It is certified that error appears in the above-identified patent and that said Letters Patent is hereby corrected as shown below:

In column 5, line 39, after 'tube', delete "2e" and insert --2a--.

In column 8, line 61, Claim 2, after 'a', delete "wipe" and insert --wiper--.

Signed and Sealed this

Ninth Day of May, 1995

Attest:

BRUCE LEHMAN

Attesting Officer

Commissioner of Patents and Trademarks